US011222605B1

(12) United States Patent
Lin et al.

(10) Patent No.: US 11,222,605 B1
(45) Date of Patent: Jan. 11, 2022

(54) CIRCUITRY, LOCAL DIMMING CONTROL METHOD AND DISPLAY APPARATUS

(71) Applicant: HIMAX TECHNOLOGIES LIMITED, Tainan (TW)

(72) Inventors: Chih-Ying Lin, Tainan (TW); Chia-Wei Tsai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/919,117

(22) Filed: Jul. 2, 2020

(51) Int. Cl.

| | |
|---|---|
| ***G09G 5/10*** | (2006.01) |
| ***G09G 3/36*** | (2006.01) |
| ***G09G 5/00*** | (2006.01) |
| ***G06F 3/038*** | (2013.01) |
| ***G09G 3/34*** | (2006.01) |

(52) U.S. Cl.
CPC ............. *G09G 3/3406* (2013.01); *G09G 3/36* (2013.01); *G09G 2320/0626* (2013.01)

(58) Field of Classification Search
CPC ..................... G09G 3/3406; G09G 2320/0646
See application file for complete search history.

(56) References Cited

U.S. PATENT DOCUMENTS

2002/0196218 A1* 12/2002 Ham .................... G09G 3/3648 345/87
2007/0279353 A1* 12/2007 Oomura ............... G09G 3/2096 345/87
2008/0203929 A1* 8/2008 Park ....................... H05B 45/22 315/158
2010/0149085 A1* 6/2010 Kim ..................... G09G 3/3426 345/102
2010/0283939 A1* 11/2010 Chou ................... G09G 3/3406 349/61
2011/0141166 A1 6/2011 Ahn et al.
2016/0180776 A1* 6/2016 Cho ......................... G09G 3/20 345/215

FOREIGN PATENT DOCUMENTS

TW 201007692 A 2/2010
TW 201506897 A 2/2015

* cited by examiner

*Primary Examiner* — Nan-Ying Yang
(74) *Attorney, Agent, or Firm* — CKC & Partners Co., LLC

(57) ABSTRACT

A circuitry for controlling a backlight module, the circuitry includes a local dimming control circuit and a backlight control circuit. The local dimming control circuit is configured to generate local dimming data based on image data and an arrangement of a plurality of light emitting units of the backlight module, in which the local dimming data includes a first local dimming data corresponding to a first light emitting unit of the plurality of light emitting units and a second local dimming data corresponding to a second light emitting unit of the plurality of light emitting units, and the number of bits of the first local dimming data is different from the number of bits of the second local dimming data. The backlight control circuit is configured to control the backlight module to irradiate backlight based on the local dimming data.

8 Claims, 16 Drawing Sheets

400

CIRCUITRY, LOCAL DIMMING CONTROL METHOD AND DISPLAY APPARATUS

BACKGROUND

Field of the Invention

The invention relates to local dimming, and more particularly to a circuitry and a local dimming control method for a backlight module and a display apparatus with local dimming functionality.

Description of Related Art

A conventional liquid crystal display (LCD) device normally includes a backlight module for providing a backlight source in order to display images. Furthermore, a local dimming technology may be applied to the backlight module to increase the contrast of the LCD device, in which the backlight brightness of specific parts are determined according to the gray level distribution of an image to be displayed. In some examples, for displaying a high gray level portion of an image, the corresponding part of the backlight module will output light with relatively high brightness; for displaying a low gray level portion of an image, the corresponding part of the backlight module will output light with relatively low brightness. However, in order to deal with more and more specific parts of the backlight module and higher screen display frequency (e.g. 90/120/240 Hertz), how to save the amount of local dimming data for transmission is one of the important issues for the industries.

SUMMARY

One aspect of the invention directs to circuitry for controlling a backlight module, the circuitry includes a local dimming control circuit and a backlight control circuit. The local dimming control circuit configured to generate local dimming data based on image data and an arrangement of a plurality of light emitting units of the backlight module, wherein the local dimming data includes a first local dimming data corresponding to a first light emitting unit of the plurality of light emitting units and a second local dimming data corresponding to a second light emitting unit of the plurality of light emitting units, and wherein the number of bits of the first local dimming data is different from the number of bits of the second local dimming data. The backlight control circuit configured to control the backlight module to irradiate backlight based on the local dimming data.

In accordance with one or more embodiments of the invention, each of the first and second local dimming data includes an indication bit, and the indication bits of the first and second local dimming data are of opposite bit values.

In accordance with one or more embodiments of the invention, the first local dimming data has most significant bits and least significant bits, and the second local dimming data only has least significant bits.

In accordance with one or more embodiments of the invention, the local dimming control circuit is further configured to provide a first indication signal for indicating the backlight control circuit to combine the most significant bits of the first local dimming data and the least significant bits of the second local dimming data into a combined second local dimming for the second light emitting unit.

In accordance with one or more embodiments of the invention, the local dimming control circuit is further configured to provide a second indication signal for notifying the backlight control circuit of the number of least significant bits of each of the first and second local dimming data.

In accordance with one or more embodiments of the invention, the backlight control circuit comprises a memory that stores the most significant bits of the first local dimming data.

In accordance with one or more embodiments of the invention, the local dimming data further includes a third local dimming data corresponding to a third light emitting unit of the light emitting units, and the number of bits of the third local dimming data is the same as the number of bits of the second local dimming data and less than the number of bits of the first local dimming data.

In accordance with one or more embodiments of the invention, each of the first to third local dimming data includes an indication bit, the indication bits of the first and second local dimming data are of opposite bit values, and the indication bits of the second and third local dimming data are of the same bit value.

In accordance with one or more embodiments of the invention, the first local dimming data has most significant bits and least significant bits, and each of the second and third local dimming data only has least significant bits.

In accordance with one or more embodiments of the invention, the local dimming control circuit is further configured to transmit an initial code data to the backlight control circuit subsequent to the local dimming data for refreshing an original initial code stored in the backlight control circuit.

Another aspect of the invention is directed to a local dimming control method for a backlight module. The local dimming control method includes: generating local dimming data based on image data and an arrangement of a plurality of light emitting units of the backlight module; and transmitting the local dimming data to a backlight control circuit that controls the backlight module to irradiate backlight accordingly. The local dimming data including a first local dimming data corresponding to a first light emitting unit of the plurality of light emitting units and a second local dimming data corresponding to a second light emitting unit of the plurality of light emitting units. The number of bits of the first local dimming data is different from the number of bits of the second local dimming data.

A further aspect of the invention is directed to a display apparatus which includes a display panel, a backlight module, a local dimming control circuit and a backlight control circuit. The display panel is configured to display an image based on image data. The backlight module has light emitting units, and is configured to provide backlight for the display panel to display the image. The local dimming control circuit is configured to generate local dimming data based on the image data and an arrangement of the plurality of light emitting units. The backlight control circuit is configured to control the backlight module to irradiate the backlight based on the local dimming data. The local dimming data includes a first local dimming data corresponding to a first light emitting unit of the plurality of light emitting units and a second local dimming data corresponding to a second light emitting unit of the plurality of light emitting units, and the number of bits of the first local dimming data is different from the number of bits of the second local dimming data.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings.

DETAILED DESCRIPTION

Figure 1:
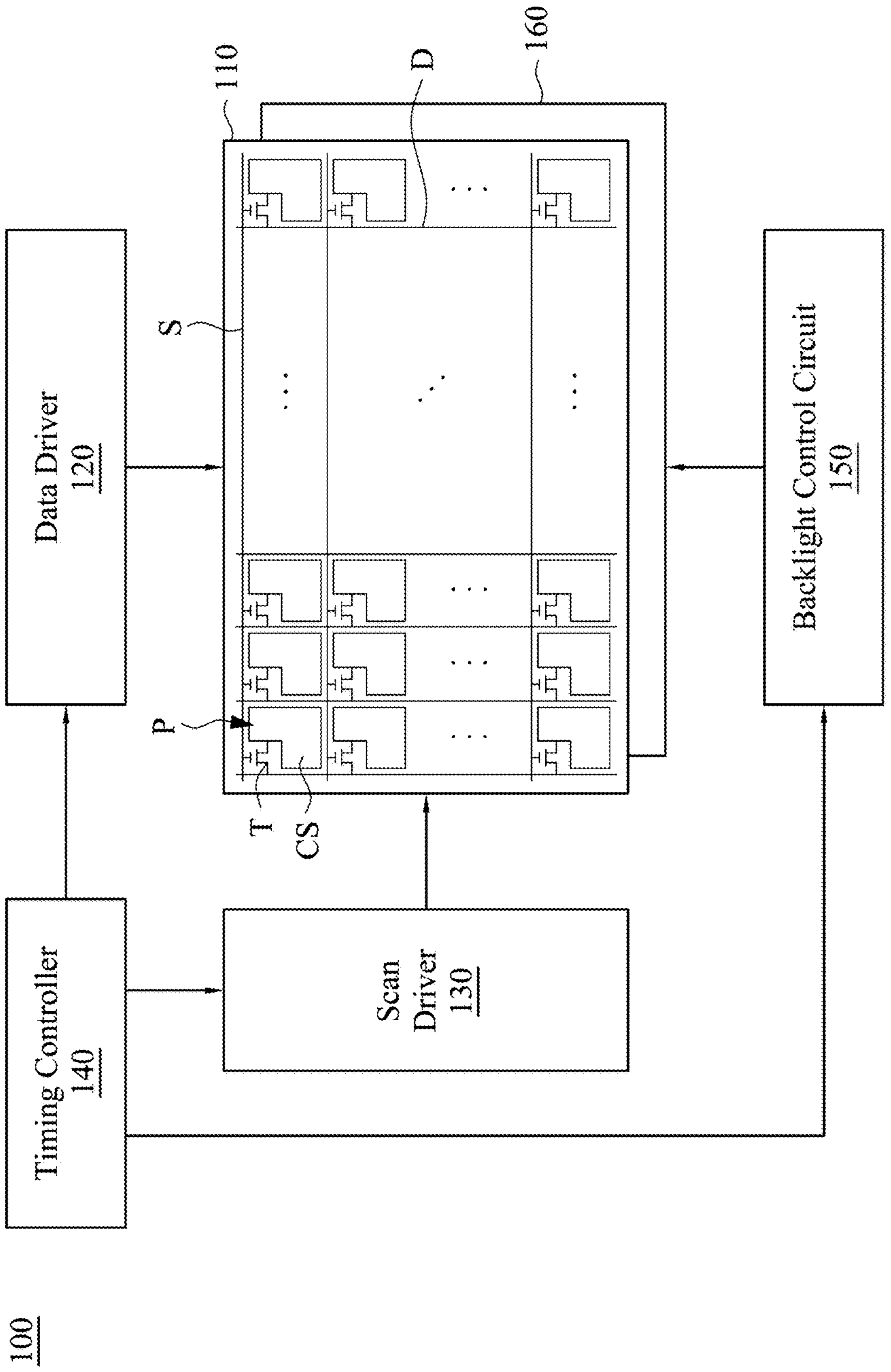
FIG. 1 is a schematic diagram of a display apparatus in accordance with one or more embodiments of the invention.

The detailed explanation of the invention is described as following. The described preferred embodiments are presented for purposes of illustrations and description, and they are not intended to limit the scope of the invention.

Terms used herein are only used to describe the specific embodiments, which are not used to limit the claims appended herewith. Unless limited otherwise, the term "a," "an," "one" or "the" of the single form may also represent the plural form. Further, the spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the following description and claims, the term "coupled" along with their derivatives, may be used. In particular embodiments, "coupled" may be used to indicate that two or more elements are in direct physical or electrical contact with each other, or may also mean that two or more elements may not be in direct contact with each other. "Coupled" may still be used to indicate that two or more elements cooperate or interact with each other.

The document may repeat reference numerals and/or letters in the various examples. This repetition is for the purpose of simplicity and clarity and does not in itself dictate a relationship between the various embodiments and/or configurations discussed.

FIG. 1 is a schematic diagram of a display apparatus 100 in accordance with one or more embodiments of the invention. The display apparatus 100 includes a liquid crystal display (LCD) panel 110, a data driver 120, a scan driver 130, a timing controller 140, a backlight control circuit 150 and a backlight module 160. The LCD panel 110 may be, for example, in a twisted nematic (TN) mode, in-plane switching (IPS) mode or any other suitable mode. In addition, the LCD panel 110 includes a plurality of pixel units P, a plurality of data lines D, and a plurality of scanning lines S. In the LCD panel 110, the pixel units P form a matrix of rows and columns. Each pixel unit P includes a switch element T that is driven by a data line D and a scan line S to be turned on for a specific time interval, such that the storage capacitor CS is charged for displaying the corresponding gray level. The data driver 120 is configured to generate data driving signals to respectively drive the data lines D to transmit gray level data to the columns of pixel units P. The scan driver 130 is configured to generate scan driving signals to drive the scan lines S to control the switching status of the switch elements T of the pixel units P. For each pixel unit, the switching status of the switch element T is turned on during a certain time period, so that the pixel unit P displays the corresponding gray level. Using the principle of visual persistence, the human eye can see the complete image in the display area of the LCD panel 110. The timing controller 140 is configured to control the scan driver 130 to sequentially drive the scan lines S of the liquid crystal display panel 110, and to control the data driver 120 to sequentially send the corresponding image data to the LCD panel 110 when the scan lines S are sequentially driven.

The timing controller 140 is also configured to direct the backlight control circuit 150 to control the backlight module 160. The backlight control circuit 150 may be implemented as a microcontroller. The backlight module 160 is arranged in back of the LCD panel 110 for providing light source to the LCD panel 110. The backlight module 160 may be a direct type backlight module 160 in which light source is arranged at the back side thereof and no light guide plate is needed.

In some embodiments, the data driver 120, the scan driver 130 and the timing controller 140 are integrated into a single integrated chip. Furthermore, in certain embodiments, the chip integrating the functions of the data driver 120, the scan driver 130 and the timing controller 140 may also provide touch detection function for the LCD panel 110 with an in-cell touch sensor structure or a touch panel disposed over the LCD panel 110.

Figure 2:
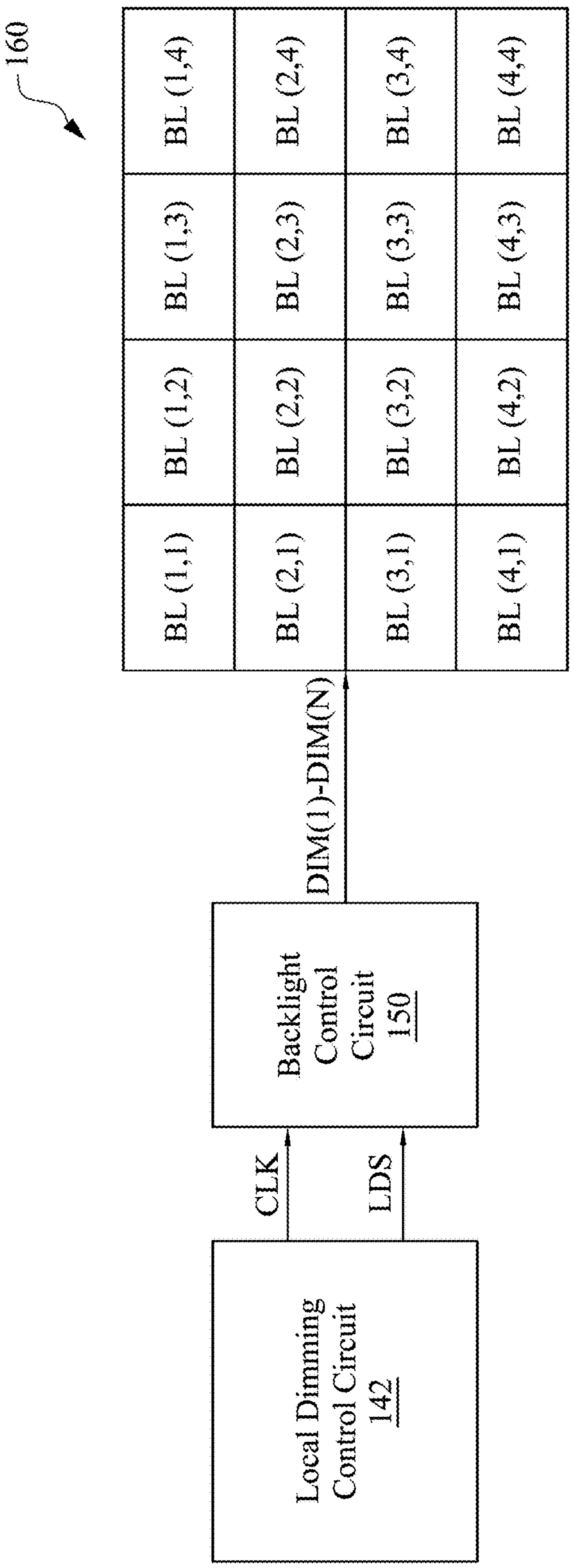
FIG. 2 exemplarily illustrates the backlight control circuit and the backlight module in FIG. 1 in addition to a local dimming control circuit in accordance with one or more embodiments of the invention.

FIG. 2 exemplarily illustrates control of the backlight control circuit 150 and the backlight module 160 in FIG. 1 in addition to a local dimming control circuit 142 in accordance with one or more embodiments of the invention. In the example of FIG. 2, the backlight module 160 is divided into 4×4 light emitting units BL(1,1)-BL(4,4), i.e., 4 rows and 4 columns of light emitting units BL(1,1)-BL(4,4). The backlight control circuit 150 is configured to provide original local dimming data DIM(1)-DIM(N) respectively for the light emitting units BL(1,1)-BL(4,4) to irradiate light according to the local dimming data signal LDS and the reference clock signal CLK from the local dimming control circuit 142. The local dimming control circuit 142 is configured to generate local dimming data included in the local dimming data signal LDS based on the image data to be displayed by the LCD panel 110 and the arrangement of the light emitting units BL(1,1)-BL(4,4). The local dimming control circuit 142 also provides the reference clock signal CLK for the backlight control circuit 150 to obtain the original local dimming data DIM(1)-DIM(N) from the local dimming data signal LDS. The local dimming control circuit 142 may be a circuit embedded in the timing controller 140 or externally connected with the timing controller 140 in FIG. 1. The original local dimming data DIM(1)-DIM(N) include bit data representing brightness respectively of the light emitting units BL(1,1)-BL(4,4). The local dimming control circuit 142 and the backlight control circuit 150 may be integrated into a single integrated chip for some embodiments.

Figure 3B:
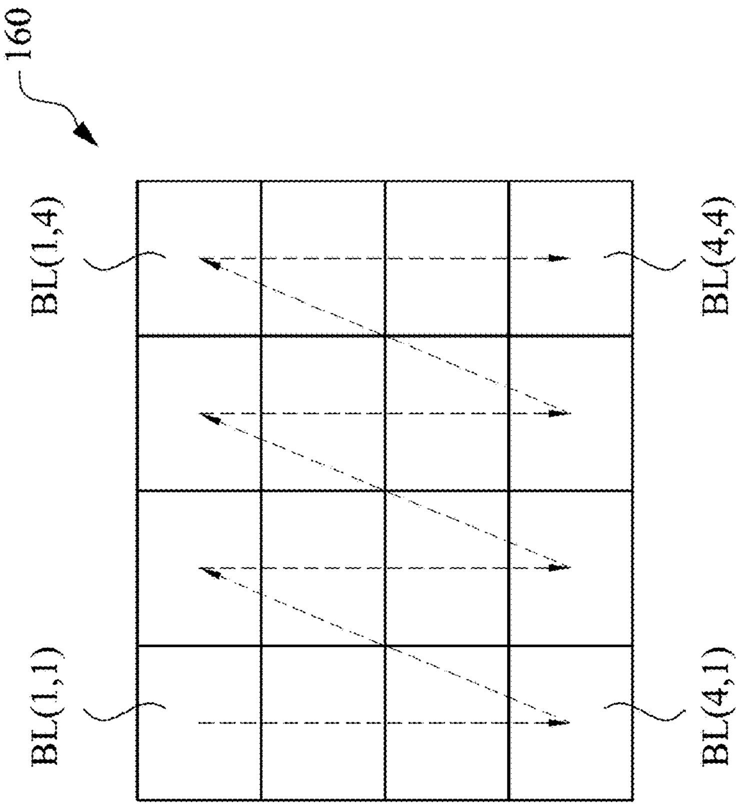
FIG. 3B exemplarily illustrates another scanning pattern of the light emitting units of the backlight module in FIG. 2.
Figure 3A:
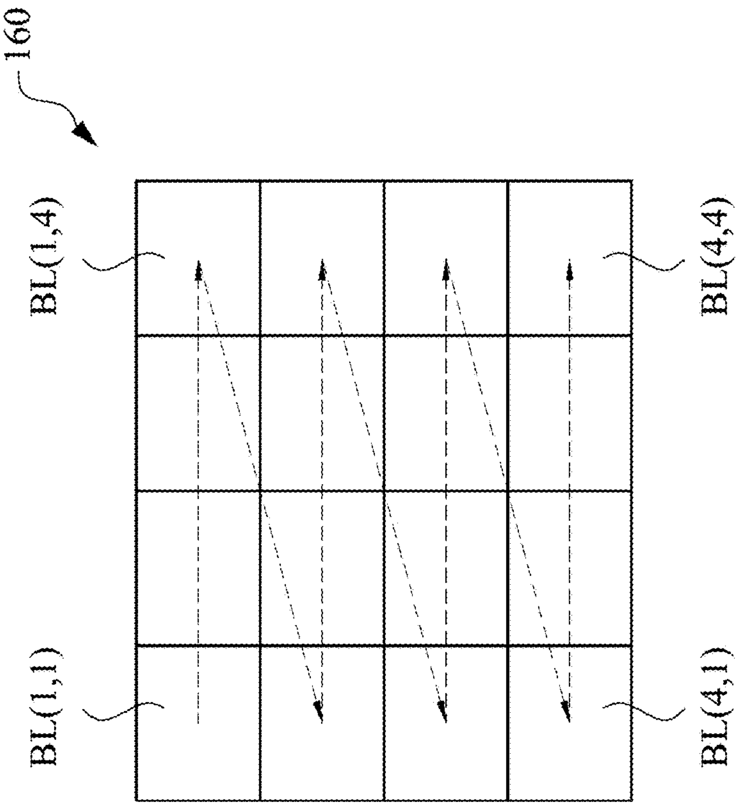
FIG. 3A exemplarily illustrates a scanning pattern of the light emitting units of the backlight module in FIG. 2.

FIG. 3A exemplarily illustrates a scanning pattern of the light emitting units BL(1,1)-BL(4,4). As shown in FIG. 3A, the scanning pattern is a Z-shaped scanning pattern. In other words, the first row of light emitting units is scanned first, and then the second row of light emitting units is scanned, and the like, and for the same row of light emitting units, the scanning direction is from left to right.

FIG. 3B exemplarily illustrates another scanning pattern of the light emitting units BL(1,1)-BL(4,4). As shown in FIG. 3B, the scanning pattern is a backwards N-shaped scanning pattern. In other words, the first column of light emitting units is scanned first, and then the second column of light emitting units is scanned, and the like, and for the same column of light emitting units, the scanning direction is from top to bottom.

It is noted that the scanning pattern of the backlight module 160 is not limited to that shown in FIG. 3A or FIG. 3B. Another scanning pattern, such as zig-zag scanning pattern, may alternatively be applied for scanning of the backlight module 160. Further, depending on the scanning pattern of the backlight module 160, the light emitting units BL(1,1)-BL(4,4) are also denoted as Zones 1–N in the following paragraphs, where N is the total number of the light emitting units BL(1,1)-BL(4,4) in the backlight module 160.

Figure 4:
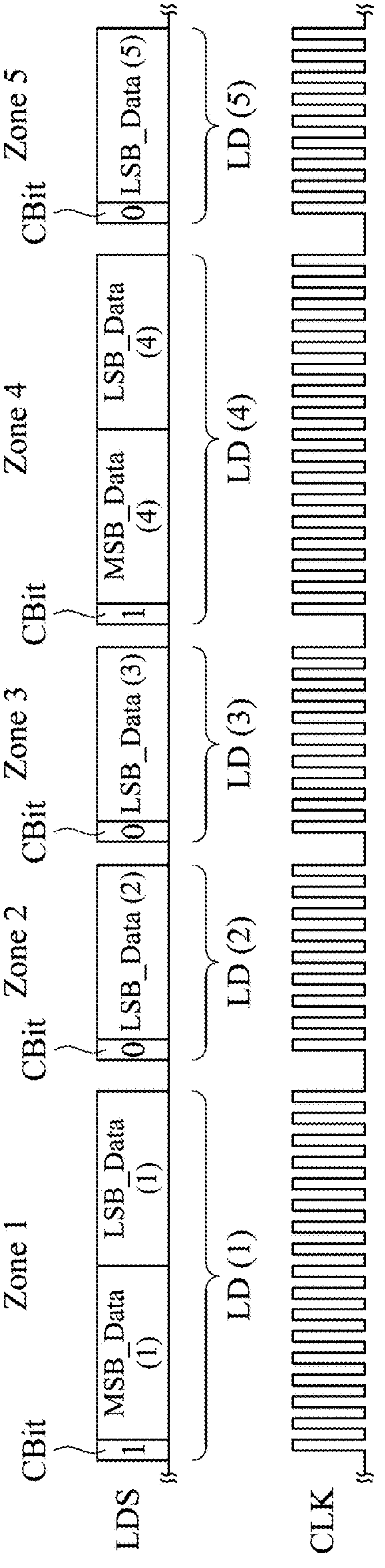
FIG. 4 is a timing diagram of the local dimming data signal and the reference clock signal transmitted by the local dimming control circuit in FIG. 2 in accordance with one or more exemplary embodiments of the invention.

FIG. 4 is a timing diagram of the local dimming data signal LDS and the reference clock signal CLK transmitted by the local dimming control circuit 142 in accordance with one or more exemplary embodiments of the invention. The local dimming data signal LDS includes local dimming data LD(1)-LD(N) respectively corresponding to Zones 1–N, and the reference clock signal CLK is in synchronization with the local dimming data signal LDS. In the case of the backlight module 160 shown in FIG. 2, N is 16. Each bit in the local dimming data signal LDS may correspond to a clock period of the reference clock signal CLK. In particular, blank intervals between the adjacent local dimming data LD(1)-LD(N) are set in the local dimming data signal LDS, such that the adjacent local dimming data LD(1)-LD(N) can be distinguished by the backlight control circuit 150. Each local dimming data LD(1)-LD(N) has an indication bit CBit for indicating whether it is a reduced local dimming data from the corresponding original local dimming data DIM(1)-DIM(N). The duration of each of the blank intervals between the adjacent local dimming data LD(1)-LD(N) may be, for example, a clock period of the reference clock signal CLK.

In specific, the local dimming control circuit 142 firstly generates original local dimming data DIM(1)-DIM(N) with equal bit length. Each original local dimming data DIM(1)-DIM(N) includes most significant bits and least significant bits. That is, the original local dimming data DIM(1) includes most significant bits MSB_DATA(1) and least significant bits LSB_DATA(1), the original local dimming data DIM(2) includes most significant bits MSB_DATA(2) and least significant bits LSB_DATA(2), and the like. In some embodiments, for each original local dimming data DIM(1)-DIM(N), the number of each of most and least significant bits is 8. After the original local dimming data DIM(1)-DIM(N) are generated, the local dimming control circuit 142 adds an indication bit CBit of "1" to the original local dimming data DIM(1) with the most significant bits MSB_DATA(1) and the least significant bits LSB_DATA(1) to form the local dimming data LD(1) for being transmitted to the backlight control circuit 150, and then compares the original local dimming data DIM(i−1) and DIM(i) for all i from 2 to N. If the most significant bits MSB_DATA(i−1) and MSB_DATA(i) of the original local dimming data DIM(i−1) and DIM(i) are identical, the most significant bits MSB_DATA(i) of the original local dimming data DIM(i) are removed, and an indication bit CBit of "0" is added to the least significant bits LSB_DATA(i) of the original local dimming data DIM(i) to form the local dimming data LD(i) for being transmitted to the backlight control circuit 150. Otherwise, if the most significant bits MSB_DATA(i−1) and MSB_DATA(i) of the original local dimming data DIM(i−1) and DIM(i) are not identical, an indication bit CBit of "1" is added to the original local dimming data DIM(i) with the most significant bits MSB_DATA(i) and the least significant bits LSB_DATA(i) to form the local dimming data LD(i) for being transmitted to the backlight control circuit 150.

For example, in a case where the most significant bits MSB_DATA(1) and MSB_DATA(2) of the original local dimming data DIM(1) and DIM(2) are identical, the local dimming control circuit 142 removes the most significant bits MSB_DATA(2) of the original local dimming data DIM(2), and an indication bit CBit of "0" is added to the least significant bits LSB_DATA(2) of the original local dimming data DIM(2) to form the local dimming data LD(2); in a case where the most significant bits MSB_DATA (3) and MSB_DATA(4) of the original local dimming data DIM(3) and DIM(4) are not identical, an indication bit CBit of "1" is added to the original local dimming data DIM(4) to form the local dimming data LD(4).

Figure 5:
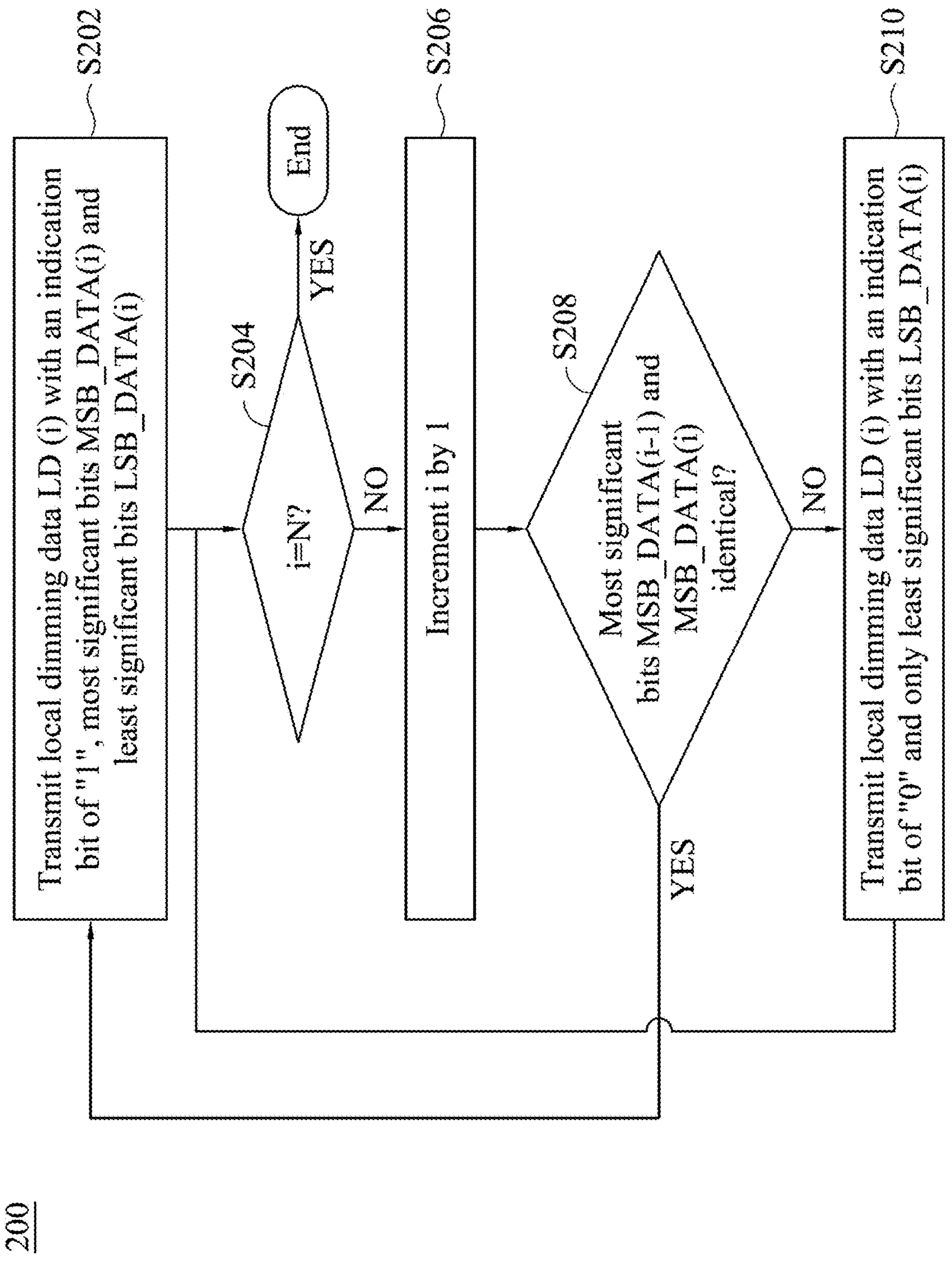
FIG. 5 a flowchart of a local dimming data transmission method performed by the local dimming control circuit in FIG. 2 in accordance with one or more embodiments of the invention.

FIG. 5 is a flowchart of a local dimming data transmission method 200 performed by the local dimming control circuit 142 in FIG. 2 in accordance with one or more embodiments of the invention. In the beginning of the local dimming data transmission method 200, a counter i is initialized to 1 before Step S202 is performed for the first time. In Step S202, the local dimming control circuit 142 transmits local dimming data LD(i) with an indication bit CBit of "1" and the most significant bits MSB_DATA(i) and the least significant bits LSB_DATA(i) of the original local dimming data DIM(i). After Step S202 is performed, the local dimming data transmission method 200 proceeds to Step S204, in which the local dimming control circuit 142 checks whether all local dimming data respectively corresponding to the light emitting units BL(1,1)-BL(4,4) are transmitted (i.e. determines whether the counter i is equal to N). If yes, the local dimming data transmission method 200 ends; else, the local dimming data transmission method 200 proceeds to Step S206, in which the counter i is incremented by 1. In Step S208, the local dimming control circuit 142 compares the most significant bits MSB_DATA(i−1) and MSB_DATA (i) respectively of the original local dimming data DIM(i−1) and DIM(i) to determine whether the most significant bits MSB_DATA(i−1) and MSB_DATA(i) are identical. If yes, the local dimming data transmission method 200 proceeds to Step S210, in which the local dimming control circuit 142 transmits local dimming data LD(i) with an indication bit CBit of "0" and only the least significant bits LSB_DATA(i) of the original local dimming data DIM(i) but without the most significant bits MSB_DATA(i) of the original local dimming data DIM(i), and then proceeds back to Step S204; else, the local dimming data transmission method 200 proceeds back to Step S202.

Figure 6:
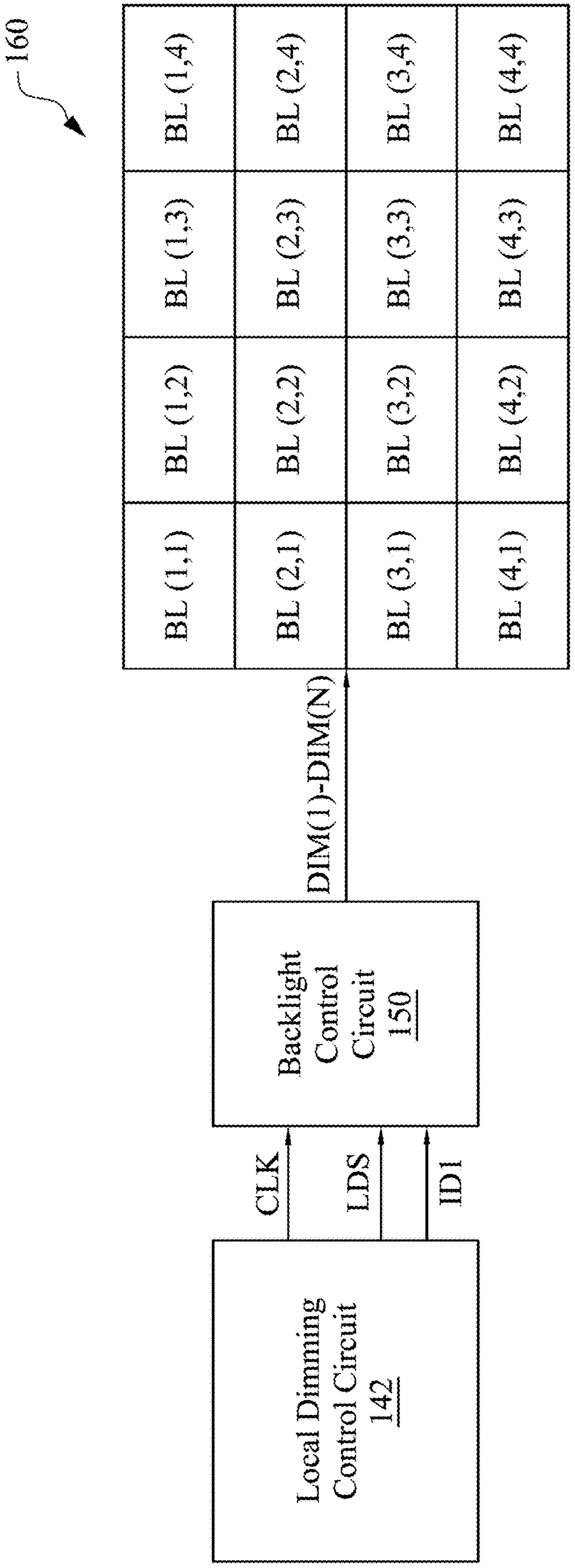
FIG. 6 exemplarily illustrates the backlight control circuit and the backlight module in FIG. 1 in addition to a local dimming control circuit in accordance with another one or more embodiments of the invention.

FIG. 6 exemplarily illustrates control of the backlight control circuit 150 and the backlight module 160 in FIG. 1 in addition to a local dimming control circuit 142 in accordance with another one or more embodiments of the invention. In the example of FIG. 6, the backlight control circuit 150 is configured to provide original local dimming data DIM(1)-DIM(N) respectively for the light emitting units BL(1,1)-BL(4,4) to irradiate light according to the local dimming data signal LDS, the reference clock signal CLK and a first indication signal ID1 from the local dimming control circuit 142. The local dimming control circuit 142 is configured to generate local dimming data included in the local dimming data signal LDS based on the image data to be displayed by the LCD panel 110 and the arrangement of the light emitting units BL(1,1)-BL(4,4). The local dimming control circuit 142 also provides the reference clock signal CLK and the first indication signal ID1 for the backlight control circuit 150 to obtain the original local dimming data DIM(1)-DIM(N) from the local dimming data signal LDS.

In particular, the first indication signal ID1 is used to indicate the backlight control circuit 150 of whether the bits of the currently received local dimming data are reduced from those of the original local dimming data corresponding to the same light emitting unit. For example, the first indication signal ID1 at high indicates that the bits of the currently received local dimming data are the same as those of the original local dimming data corresponding to the same light emitting unit, and when receiving such first indication signal ID1, the backlight control circuit 150 stores the most significant bits of the currently received local dimming data; the first indication signal ID1 at low indicates that the bits of the currently received local dimming data are reduced from those of the original local dimming data corresponding to the same light emitting unit, i.e., the currently received local dimming data only have least significant bits, and when receiving such first indication signal ID1, the backlight control circuit 150 combines the last stored most significant bits and the currently received local dimming data into a combined local dimming data for the same light emitting unit.

Figure 7:
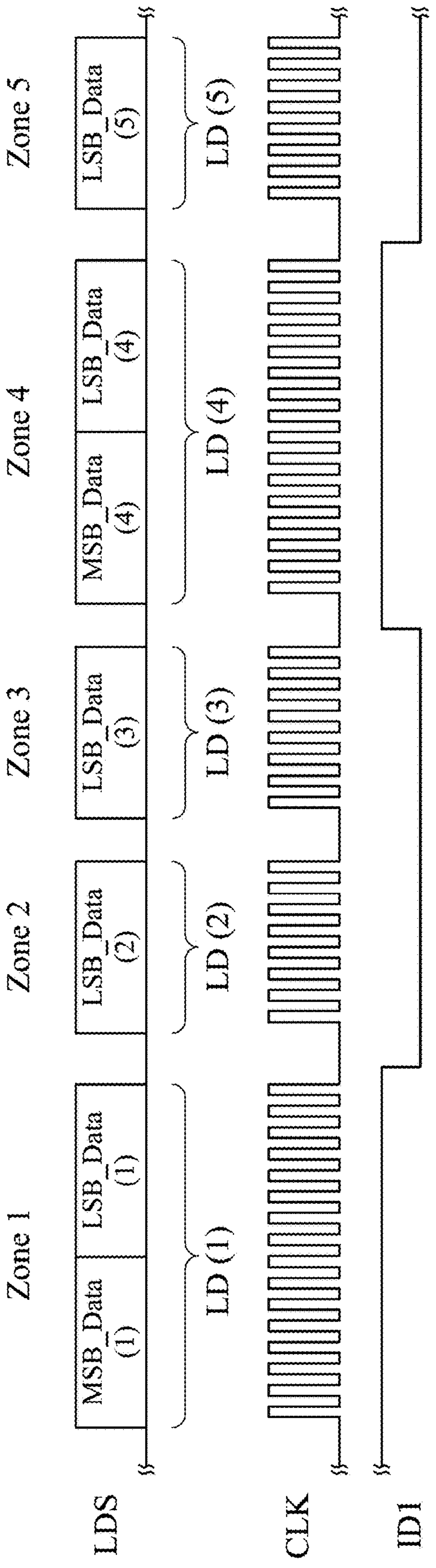
FIG. 7 is a timing diagram of the local dimming data signal, the reference clock signal and the first indication signal transmitted by the local dimming control circuit in FIG. 6 in accordance with one or more exemplary embodiments of the invention.

FIG. 7 is a timing diagram of the local dimming data signal LDS, the reference clock signal CLK and the first indication signal ID1 transmitted by the local dimming control circuit 142 in FIG. 6 in accordance with one or more exemplary embodiments of the invention. The local dimming control circuit 142 firstly transmits the original local dimming data DIM(1) as the local dimming data LD(1) and outputs the first indication signal ID1 as high to the backlight control circuit 150 for Zone 1, and then compares the original local dimming data DIM(i−1) and DIM(i) for all i from 2 to N. If the most significant bits MSB_DATA(i−1) and MSB_DATA(i) of the original local dimming data DIM(i−1) and DIM(i) are identical, the most significant bits MSB_DATA(i) of the original local dimming data DIM(i) is removed, and then only the least significant bits LSB_DATA (i) of the original local dimming data DIM(i) are transmitted as the local dimming data LD(i) to the backlight control circuit 150 for Zone i, and the first indication signal ID1 is outputted as low. Otherwise, if the most significant bits MSB_DATA(i−1) and MSB_DATA(i) of the original local dimming data DIM(i−1) and DIM(i) are not identical, the full original local dimming data DIM(i) with the most significant bits MSB_DATA(i) and the least significant bits LSB_DATA(i) are transmitted as the local dimming data LD(i) to the backlight control circuit 150 for Zone i, and the first indication signal ID1 is outputted as high.

For example, in a case where the most significant bits MSB_DATA(1) and MSB_DATA(2) of the original local dimming data DIM(1) and DIM(2) are identical, as shown in FIG. 7, only the least significant bits LSB_DATA(2) of the original local dimming data DIM(2) are transmitted as the local dimming data LD(2) for Zone 2, and the first indication signal ID1 is set as low; in a case where the most significant bits MSB_DATA(3) and MSB_DATA(4) of the original local dimming data DIM(3) and DIM(4) are not identical, as shown in FIG. 7, the full original local dimming data DIM(4) with the most significant bits MSB_DATA(4) and the least significant bits LSB_DATA(4) are transmitted as the local dimming data LD(4) for Zone 4, and the first indication signal ID1 is set as high.

Figure 8:
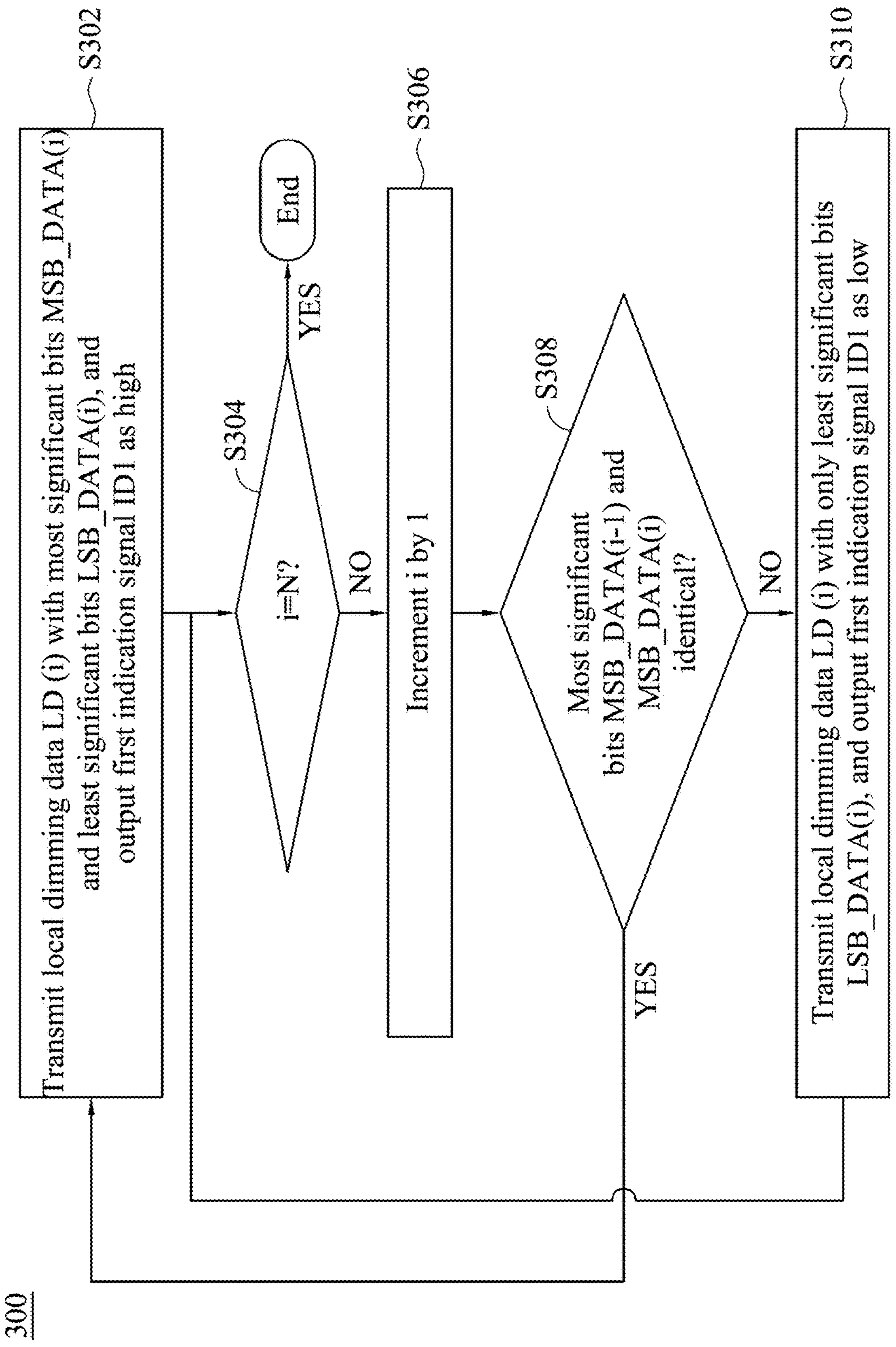
FIG. 8 a flowchart of a local dimming data transmission method performed by the local dimming control circuit in FIG. 6 in accordance with one or more embodiments of the invention.

FIG. 8 is a flowchart of a local dimming data transmission method 300 performed by the local dimming control circuit 142 in FIG. 6 in accordance with one or more embodiments of the invention. In the beginning of the local dimming data transmission method 300, a counter i is initialized to 1 before Step S302 is performed for the first time. In Step S302, the local dimming control circuit 142 transmits local dimming data LD(i) with the most significant bits MSB_DATA(i) and the least significant bits LSB_DATA(i) of the original local dimming data DIM(i), and outputs the first indication signal ID1 as high. After Step S302 is performed, the local dimming data transmission method 300 proceeds to Step S304, in which the local dimming control circuit 142 checks whether all local dimming data respectively corresponding to the light emitting units BL(1,1)-BL(4,4) are transmitted (i.e. determines whether the counter i is equal to N). If yes, the local dimming data transmission method 300 ends; else, the local dimming data transmission method 300 proceeds to Step S306, in which the counter i is incremented by 1. In Step S308, the local dimming control circuit 142 compares the most significant bits MSB_DATA(i−1) and MSB_DATA(i) respectively of the original local dimming data DIM(i−1) and DIM(i) to determine whether the most significant bits MSB_DATA(i−1) and MSB_DATA(i) are identical. If yes, the local dimming data transmission method 300 proceeds to Step S310, in which the local dimming control circuit 142 transmits only the least significant bits LSB_DATA(i) of the original local dimming data DIM(i) as the local dimming data LD(i) but without the most significant bits MSB_DATA(i) of the original local dimming data DIM(i), and outputs the first indication signal ID1 as low, and then proceeds back to Step S304; else, the local dimming data transmission method 300 proceeds back to Step S302.

Figure 9:
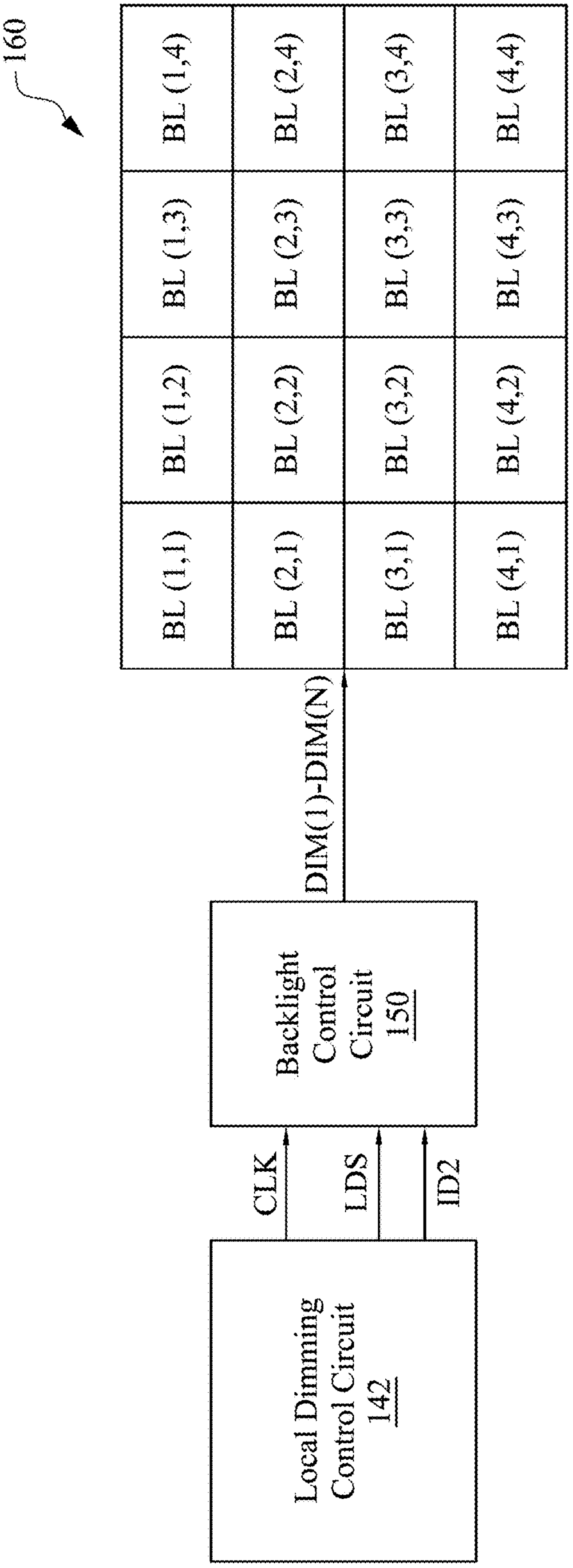
FIG. 9 exemplarily illustrates the backlight control circuit and the backlight module in FIG. 1 in addition to a local dimming control circuit in accordance with another one or more embodiments of the invention.

FIG. 9 exemplarily illustrates control of the backlight control circuit 150 and the backlight module 160 in FIG. 1 in addition to a local dimming control circuit 142 in accordance with another one or more embodiments of the invention. In the example of FIG. 9, the backlight control circuit 150 is configured to provide original local dimming data DIM(1)-DIM(N) respectively for the light emitting units BL(1,1)-BL(4,4) to irradiate light according to the local dimming data signal LDS, the reference clock signal CLK and a second indication signal ID2 from the local dimming control circuit 142. The local dimming control circuit 142 is configured to generate local dimming data included in the local dimming data signal LDS based on the image data to be displayed by the LCD panel 110 and the arrangement of the light emitting units BL(1,1)-BL(4,4). The local dimming control circuit 142 also provides the reference clock signal CLK and the second indication signal ID2 for the backlight control circuit 150 to obtain the original local dimming data DIM(1)-DIM(N) from the local dimming data signal LDS.

In particular, the second indication signal ID2 is used to indicate the backlight control circuit 150 of the number of bits of the least significant bits in each local dimming data. For example, the second indication signal ID2 at high indicates that the number of most significant bits of each local dimming data is 10 and the number of least significant bits of each local dimming data is 6, while the second indication signal ID2 at low indicates that the number of most significant bits and the number of least significant bits of each local dimming data are all 8. It is noted that the number of most significant bits and the number of least significant bits of each local dimming data herein are merely exemplarily examples and can be determined according to various design parameters and application requirements.

Figure 10:
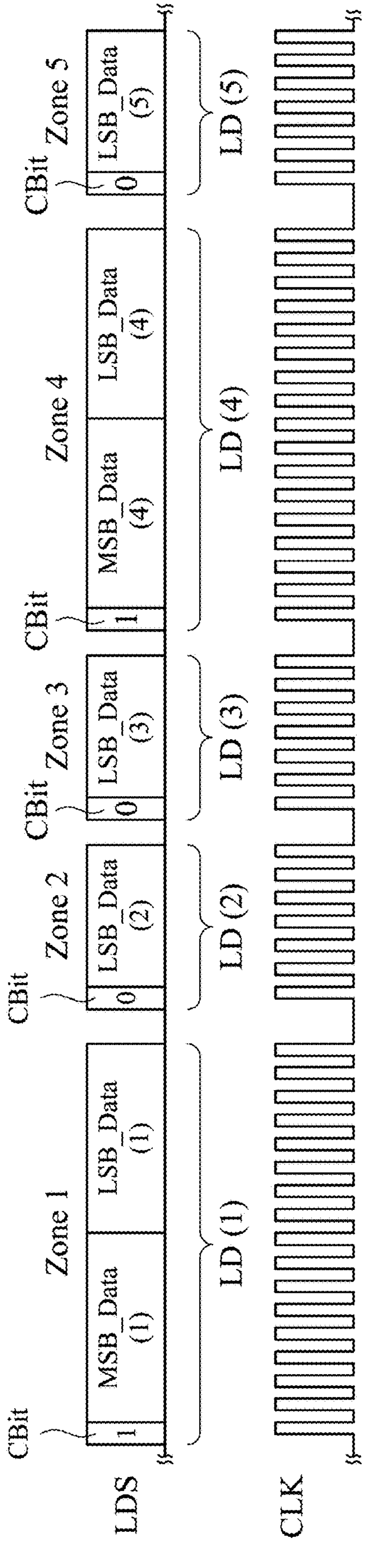
FIG. 10 is a timing diagram of the local dimming data signal and the reference clock signal transmitted by the local dimming control circuit in FIG. 9 in accordance with one or more exemplary embodiments of the invention.

FIG. 10 is a timing diagram of the local dimming data signal LDS and the reference clock signal CLK transmitted by the local dimming control circuit 142 in FIG. 9 in a case where the second indication signal ID2 is outputted as high in accordance with one or more exemplary embodiments of the invention. The local dimming control circuit 142 firstly adds an indication bit CBit of "1" to the original local dimming data DIM(1) with the 10-bit most significant bits MSB_DATA(1) and the 6-bit least significant bits LSB-_DATA(1) to form the local dimming data LD(1) for being transmitted to the backlight control circuit 150, and then compares the original local dimming data DIM(i−1) and DIM(i) for all i from 2 to N. If the 10-bit most significant bits MSB_DATA(i−1) and MSB_DATA(i) of the original local dimming data DIM(i−1) and DIM(i) are identical, the 10-bit most significant bits MSB_DATA(i) of the original local dimming data DIM(i) are removed, and an indication bit CBit of "0" is added to the 6-bit least significant bits LSB_DATA(i) of the original local dimming data DIM(i) to form the local dimming data LD(i) for being transmitted to the backlight control circuit 150. Otherwise, if the 10-bit most significant bits MSB_DATA(i−1) and MSB_DATA(i) of the local dimming data LD(i−1) and LD(i) are not identical, an indication bit CBit of "1" is added to the original local dimming data DIM(i) with the 10-bit most significant bits MSB_DATA(i) and the 6-bit least significant bits LSB_DATA(i) to form the local dimming data LD(i) for being transmitted to the backlight control circuit 150.

Figure 11:
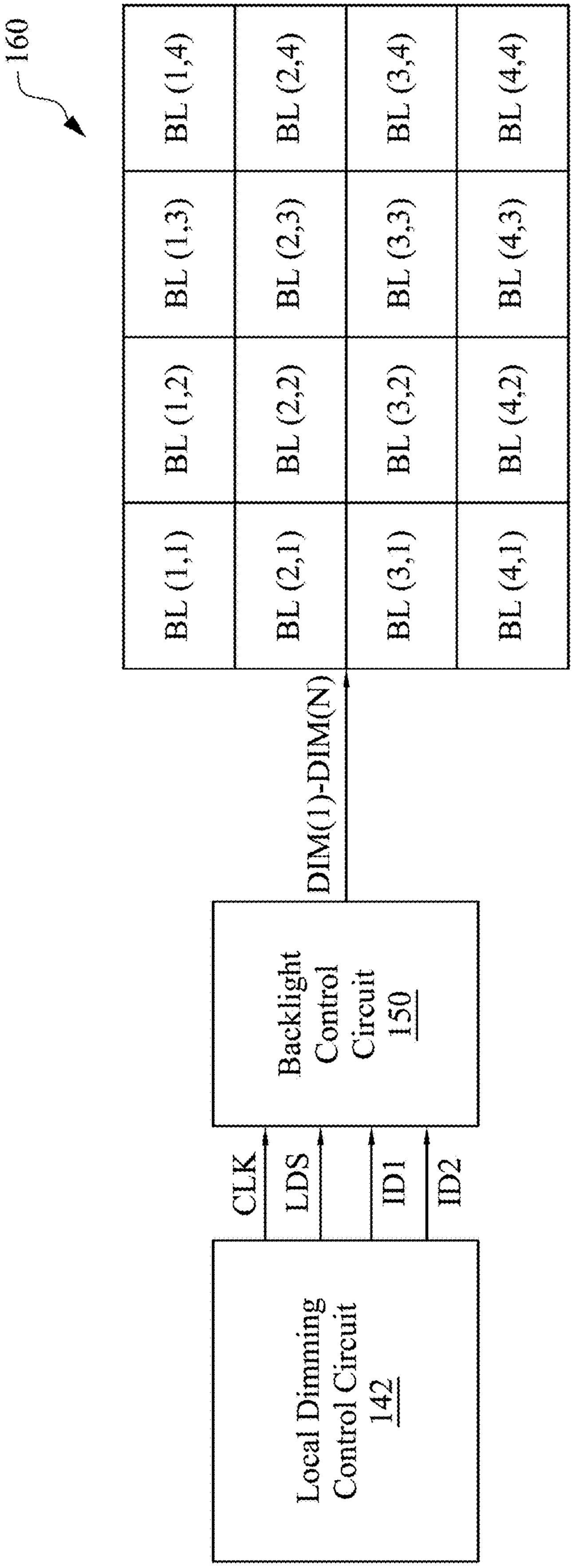
FIG. 11 exemplarily illustrates the backlight control circuit and the backlight module in FIG. 1 in addition to a local dimming control circuit in accordance with another one or more embodiments of the invention.

FIG. 11 exemplarily illustrates control of the backlight control circuit 150 and the backlight module 160 in FIG. 1 in addition to a local dimming control circuit 142 in accordance with another one or more embodiments of the invention. In the example of FIG. 11, the backlight control circuit 150 is configured to provide original local dimming data DIM(1)-DIM(N) respectively for the light emitting units BL(1,1)-BL(4,4) to irradiate light according to the local dimming data signal LDS, the reference clock signal CLK, the first indication signal ID1 and the second indication signal ID2 from the local dimming control circuit 142. The local dimming control circuit 142 is configured to generate local dimming data included in the local dimming data signal LDS based on the image data to be displayed by the LCD panel 110 and the arrangement of the light emitting units BL(1,1)-BL(4,4). The local dimming control circuit 142 also provides the reference clock signal CLK, the first indication signal ID1 and the second indication signal ID2 for the backlight control circuit 150 to obtain the original local dimming data DIM(1)-DIM(N) from the local dimming data signal LDS.

Figure 12:
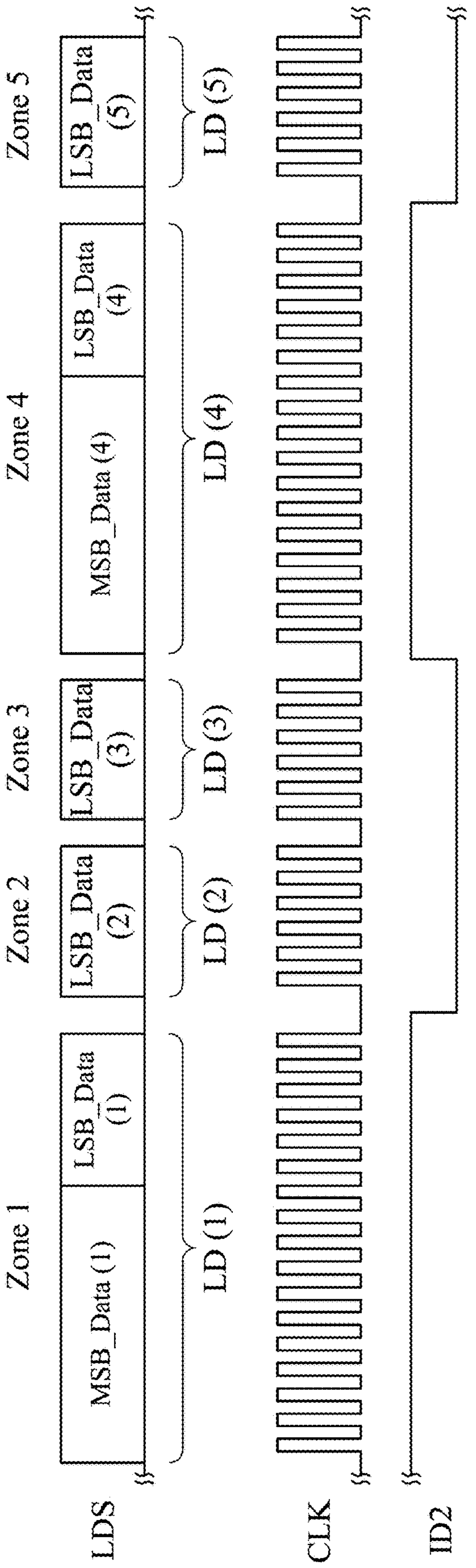
FIG. 12 is a timing diagram of the local dimming data signal, the reference clock signal and the first indication signal transmitted by the local dimming control circuit in FIG. 11 in accordance with one or more exemplary embodiments of the invention.

FIG. 12 is a timing diagram of the local dimming data signal LDS, the reference clock signal CLK and the first indication signal ID1 transmitted by the local dimming control circuit 142 in FIG. 11 in a case where the second indication signal ID2 is outputted as high in accordance with one or more exemplary embodiments of the invention. The local dimming control circuit 142 firstly transmits the original local dimming data DIM(1) with the 10-bit most significant bits MSB_DATA(1) and the 6-bit least significant bits LSB_DATA(1) as the local dimming data LD(1) and outputs the first indication signal ID1 as high to the backlight control circuit 150 for Zone 1, and then compares the original local dimming data DIM(i−1) and DIM(i) for all i from 2 to N. If the 10-bit most significant bits MSB_DATA (i−1) and MSB_DATA(i) of the original local dimming data DIM(i−1) and DIM(i) are identical, the 10-bit most significant bits MSB_DATA(i) of the original local dimming data DIM(i) are removed, and then only the 6-bit least significant bits LSB_DATA(i) of the original local dimming data DIM (i) are transmitted as the local dimming data LD(i) to the backlight control circuit 150 for Zone i, and the first indication signal ID1 is outputted as low. Otherwise, if the 10-bit most significant bits MSB_DATA(i−1) and MSB_DATA(i) of the original local dimming data DIM(i−1) and DIM(i) are not identical, the full original local dimming data DIM(i) with the 10-bit most significant bits MSB_DATA(i) and the 6-bit least significant bits LSB_DATA(i) are transmitted as the local dimming data LD(i) to the backlight control circuit 150 for Zone i, and the first indication signal ID1 is outputted as high.

Figure 13A:
FIG. 13A exemplarily shows an image to be displayed by the LCD panel in FIG. 1.
Figure 13B:
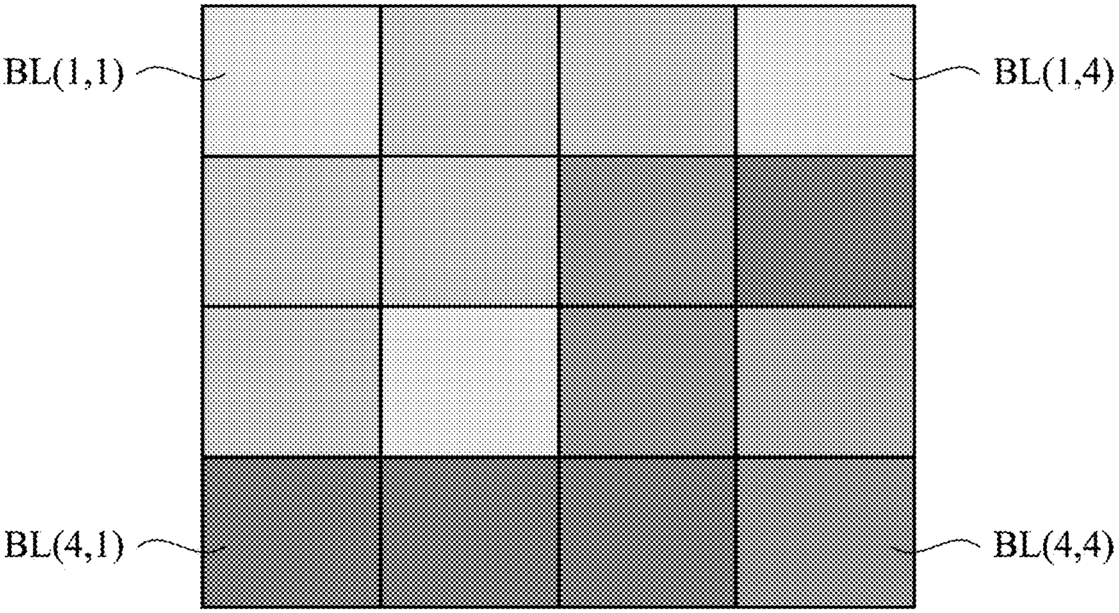
FIG. 13B shows averaged gray levels of portions of the LCD panel in FIG. 1 corresponding to the image shown in FIG. 13A.

FIG. 13A exemplarily shows an image to be displayed by the LCD panel 110, and FIG. 13B shows average gray levels of portions of the LCD panel 110 corresponding to the image shown in FIG. 13A. The display area of the LCD panel 110 is divided into several portions respectively corresponding to the light emitting units BL(1,1)-BL(4,4) of the backlight module 160 that adopts Z-shaped scanning. In particular, the local dimming control circuit 142 detects averaged gray levels of the sub-images of the image respectively corresponding to the light emitting units BL(1,1)-BL(4,4), and then converts these gray levels into original local dimming data DIM(1)-DIM(N) respectively for the light emitting units BL(1,1)-BL(4,4). As shown in FIGS. 13A-13B, the relatively bright portions of the LCD panel 110 respectively corresponding to relatively bright sub-images have high gray levels, while the relatively dark portions of the LCD panel 110 respectively corresponding to relatively dark sub-images have low gray levels.

In the example shown in FIG. 13B, the original local dimming data DIM(1)-DIM(6) have the same most significant bits, the original local dimming data DIM(7)-DIM(8) have the same most significant bits, the original local dimming data DIM(9)-DIM(10) have the same most significant bits, and the original local dimming data DIM(11)-DIM(16) have the same most significant bits. Also, the most significant bits MSB_DATA(1) are different from the most significant bits MSB_DATA(7), the most significant bits MSB_DATA(7) are different from the most significant bits MSB_DATA(9), and the most significant bits MSB_DATA(9) are different from the most significant bits MSB_DATA(11). If the local dimming control circuit 142 and the backlight control circuit 150 in FIG. 1 are applied as well as the local dimming data transmission method 200, the total number of bits of the local dimming data LD(1)-LD(16) transmitted from the local dimming control circuit 142 to the backlight control circuit 150 is 4×17+12×9=176, and the local dimming data compression ratio is (16×16)/176=1.45.

Figure 14A:
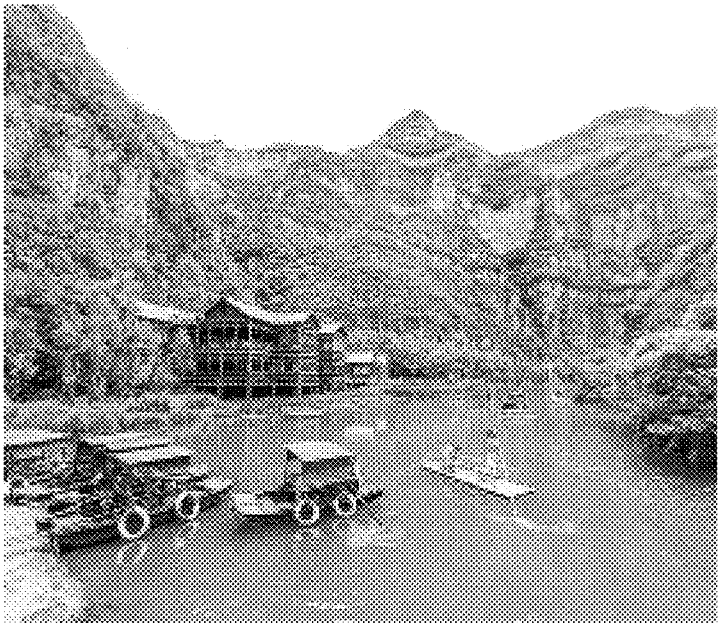
FIG. 14A exemplarily shows another image to be displayed by the LCD panel in FIG. 1.
Figure 14B:
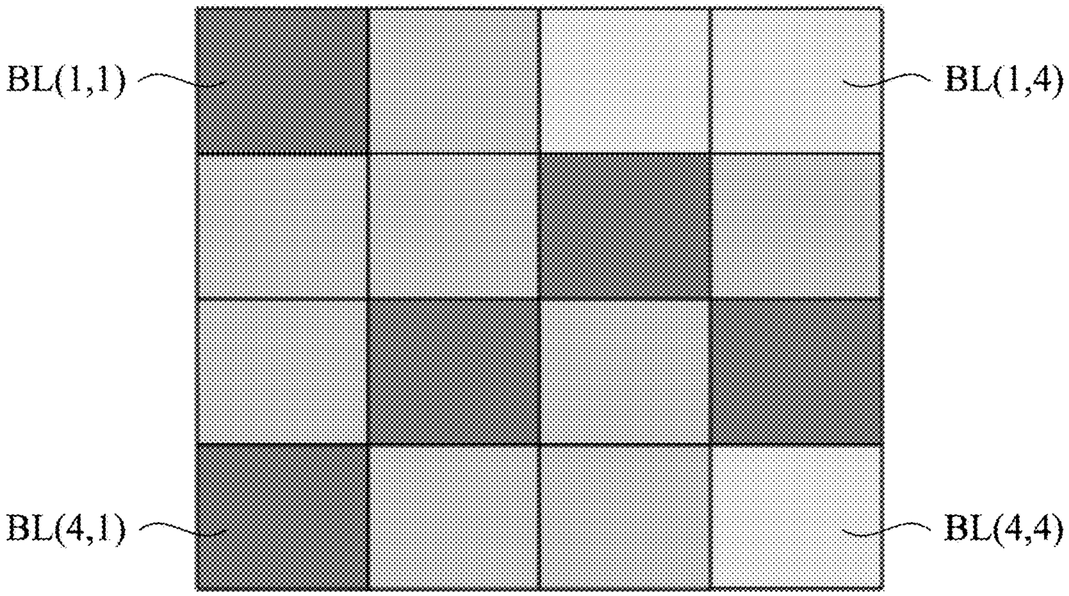
FIG. 14B shows averaged gray levels of portions of the LCD panel in FIG. 1 corresponding to the image shown in FIG. 14A.

FIG. 14A exemplarily shows another image to be displayed by the LCD panel 110, and FIG. 14B shows averaged gray levels of portions of the LCD panel 110 corresponding to the image shown in FIG. 14A. In the example shown in FIG. 14B, all of the original local dimming data DIM(1)-DIM(16) have the same most significant bits. If the local dimming control circuit 142 and the backlight control circuit 150 in FIG. 1 are applied as well as the local dimming data transmission method 200, the total number of bits of the local dimming data LD(1)-LD(16) transmitted from the local dimming control circuit 142 to the backlight control circuit 150 is 1×17+15×9=152, and the local dimming data compression ratio is (16×16)/152=1.68.

Figure 15:
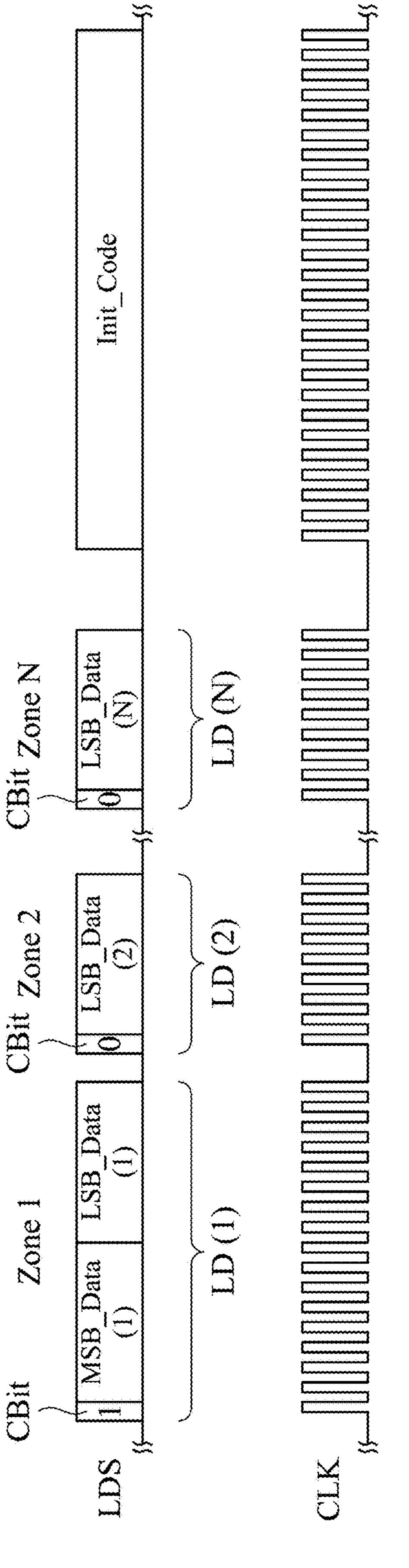
FIG. 15 is a timing diagram of the local dimming data signal and the reference clock signal transmitted by the local dimming control circuit in FIG. 2 in accordance with another one or more exemplary embodiments of the invention.

FIG. 15 is a timing diagram of local dimming data signal LDS and a reference clock signal CLK transmitted by the local dimming control circuit 142 in FIG. 2 in accordance with another one or more exemplary embodiments of the invention. The local dimming control circuit 142 determines whether the remaining time after local dimming data compression is sufficient for transmitting initial code data Init_Code to the backlight control circuit 150 for refreshing the stored initial code data. The initial code data Init_Code may include, but is not limited to, parameters of LED brightness control, LED frequency spectra, current limiting, short-circuit protection and/or error report. If the remaining time is sufficient, the local dimming control circuit 142 transmits the initial code data Init_Code to the backlight control circuit 150 subsequent to the local dimming data LD(1)-LD(N).

Figure 16:
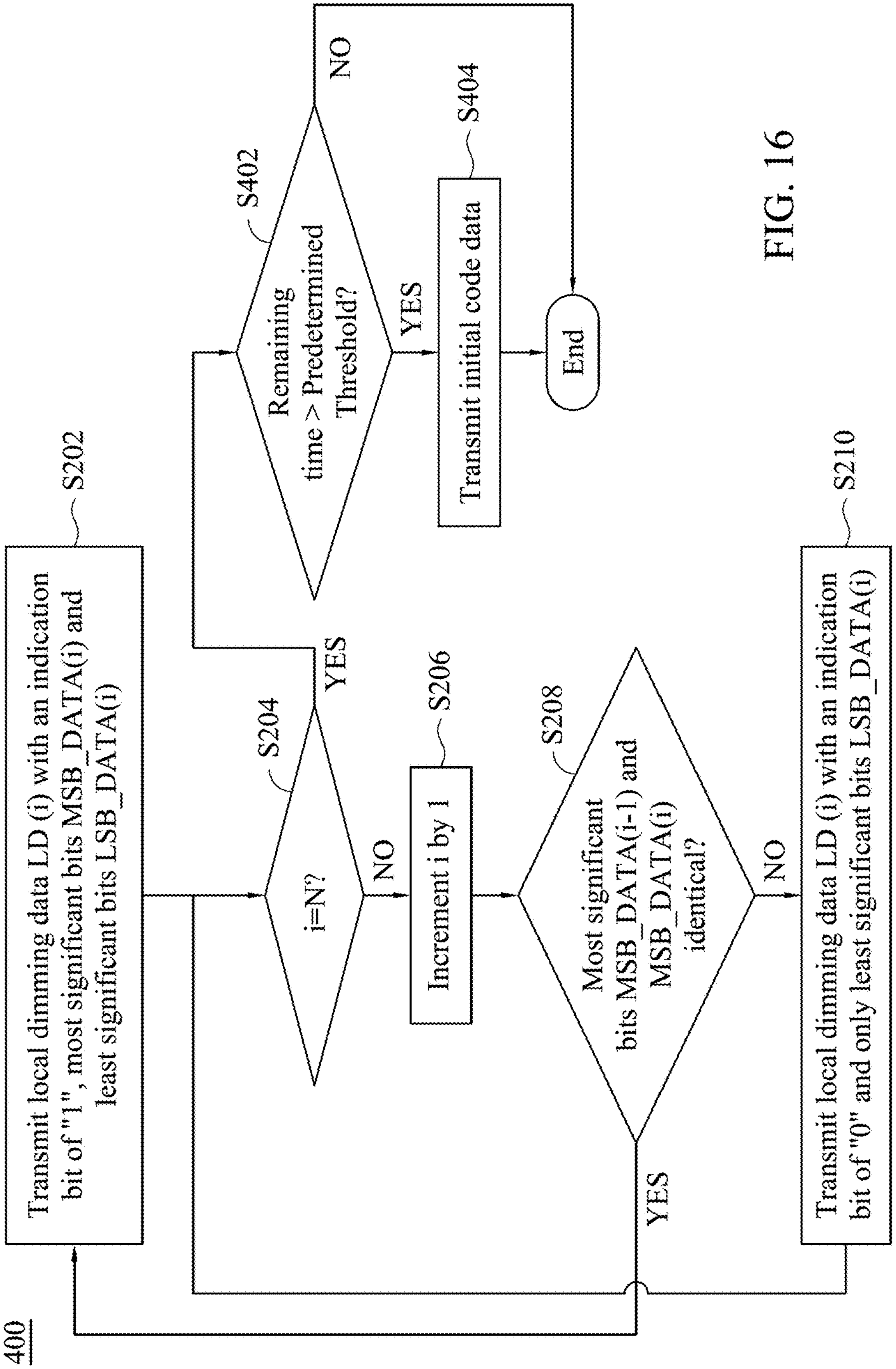
FIG. 16 a flowchart of a local dimming data transmission method performed by the local dimming control circuit in FIG. 2 in accordance with another one or more embodiments of the invention.

FIG. 16 is a flowchart of a local dimming data transmission method 400 performed by the local dimming control circuit 142 in accordance with one or more embodiments of the invention. The difference between the local dimming data transmission methods 200 and 400 is, in the local dimming data transmission method 400, if all local dimming data respectively corresponding to the light emitting units BL(1,1)-BL(4,4) are transmitted, Step S402 is then performed to determine whether the remaining time is longer than the predetermined threshold corresponding to the time required for transmitting the initial code data Init_Code. If yes, Step S404 is performed, in which the local dimming control circuit 142 transmits the initial code data Init_Code to the backlight control circuit 150, and then the local dimming data transmission method 400 ends.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims.

What is claimed is:

1. A circuitry for controlling a backlight module, the circuitry comprising:

a local dimming control circuit configured to generate local dimming data based on image data and an arrangement of a plurality of light emitting units of the backlight module, wherein the local dimming data includes a first local dimming data corresponding to a first light emitting unit of the plurality of light emitting units and a second local dimming data corresponding to a second light emitting unit of the plurality of light emitting units, and wherein the number of bits of the first local dimming data is different from the number of bits of the second local dimming data, the first local dimming data has most significant bits and least significant bits, and the second local dimming data only has least significant bits; and a backlight control circuit configured to control the backlight module to irradiate backlight based on the local dimming data, wherein the local dimming control circuit is further configured to provide an indication signal for indicating the backlight control circuit to combine the most significant bits of the first local dimming data and the least significant bits of the second local dimming data into a combined second local dimming data for the second light emitting unit.

2. The circuitry of claim 1, wherein each of the first and second local dimming data includes an indication bit, and wherein the indication bits of the first and second local dimming data are of opposite bit values.

3. The circuitry of claim 1, wherein the backlight control circuit comprises a memory that stores the most significant bits of the first local dimming data.

4. The circuitry of claim 1, wherein the local dimming data further includes a third local dimming data corresponding to a third light emitting unit of the plurality of light emitting units, and wherein the number of bits of the third local dimming data is the same as the number of bits of the second local dimming data and less than the number of bits of the first local dimming data.

5. The circuitry of claim 4, wherein each of the first to third local dimming data includes an indication bit;

wherein the indication bits of the first and second local dimming data are of opposite bit values, and the indication bits of the second and third local dimming data are of the same bit value.

6. The circuitry of claim 1, wherein the local dimming control circuit is further configured to transmit an initial code data to the backlight control circuit subsequent to the local dimming data for refreshing an original initial code data stored in the backlight control circuit.

7. A display apparatus comprising:

a display panel configured to display an image based on image data;

a backlight module configured to provide backlight for the display panel to display the image, the backlight module having a plurality of light emitting units;

a local dimming control circuit configured to generate local dimming data based on the image data and an arrangement of the plurality of light emitting units; and a backlight control circuit configured to control the backlight module to irradiate the backlight based on the local dimming data;

wherein the local dimming data includes a first local dimming data corresponding to a first light emitting unit of the plurality of light emitting units and a second local dimming data corresponding to a second light emitting unit of the plurality of light emitting units, and wherein the number of bits of the first local dimming data is different from the number of bits of the second local dimming data, the first local dimming data has most significant bits and least significant bits, and the second local dimming data only has least significant bits, wherein the local dimming control circuit is further configured to provide an indication signal for indicating the backlight control circuit to combine the most significant bits of the first local dimming data and the least significant bits of the second local dimming data into a combined second local dimming data for the second light emitting unit.

8. A circuitry for controlling a backlight module, the circuitry comprising:

a local dimming control circuit configured to generate local dimming data based on image data and an arrangement of a plurality of light emitting units of the backlight module, wherein the local dimming data includes a first local dimming data corresponding to a first light emitting unit of the plurality of light emitting units and a second local dimming data corresponding to a second light emitting unit of the plurality of light emitting units, and wherein the number of bits of the first local dimming data is different from the number of bits of the second local dimming data, the first local dimming data has most significant bits and least significant bits, and the second local dimming data only has least significant bits; and a backlight control circuit configured to control the backlight module to irradiate backlight based on the local dimming data, wherein the local dimming control circuit is further configured to provide an indication signal for notifying the backlight control circuit of a number of the least significant bits of each of the first and second local dimming data.

* * * * *